June 30, 1953  H. S. WILSON  2,643,482
MOBILE SUCTION MACHINE FOR REMOVING INSECTS FROM PLANTS
Filed March 26, 1948  7 Sheets-Sheet 1

Inventor

Harry S. Wilson

By Clarence A. O'Brien
and Harvey B. Jacobson
Attorneys

June 30, 1953   H. S. WILSON   2,643,482
MOBILE SUCTION MACHINE FOR REMOVING INSECTS FROM PLANTS
Filed March 26, 1948   7 Sheets-Sheet 2

Inventor
Harry S. Wilson
By Clarence A. O'Brien
and Harvey B. Jacobson
Attorneys June 30, 1953 — H. S. WILSON — 2,643,482
MOBILE SUCTION MACHINE FOR REMOVING INSECTS FROM PLANTS
Filed March 26, 1948 — 7 Sheets-Sheet 3

Inventor
Harry S. Wilson
By Clarence A. O'Brien and Harvey B. Jacobson
Attorneys June 30, 1953     H. S. WILSON     2,643,482
MOBILE SUCTION MACHINE FOR REMOVING INSECTS FROM PLANTS
Filed March 26, 1948     7 Sheets-Sheet 4

Inventor
Harry S. Wilson
By *Clarence A. O'Brien and Harvey B. Jacobson*
Attorneys

June 30, 1953     H. S. WILSON     2,643,482
MOBILE SUCTION MACHINE FOR REMOVING INSECTS FROM PLANTS
Filed March 26, 1948     7 Sheets-Sheet 5

Inventor

Harry S. Wilson

By Clarence A. O'Brien and Harvey B. Jacobson
Attorneys

Patented June 30, 1953

2,643,482

UNITED STATES PATENT OFFICE 2,643,482

MOBILE SUCTION MACHINE FOR REMOVING INSECTS FROM PLANTS

Harry S. Wilson, Andrews, Tex.

Application March 26, 1948, Serial No. 17,324

3 Claims. (Cl. 43—140)

This invention relates to a plant cleaning and insect control attachment for a tractor and has for its primary object the removal of undesirable matter and insects from a row or a plurality of rows of standing plants.

Another object is to destroy the insects removed from the plants.

A further object is to cover both the upper and under sides of the plants with insecticide so as to inhibit the reproduction and growth of insects or their larva which may adhere to the plants after treatment.

A still further object is to insure adequate treatment of the plants irrespective of the type of terrain in which they are growing.

The above and other objects may be attained by employing this invention which embodies among its features a boot having an open side adapted to be advanced beside and in parallel relation to a row of standing plants, a conduit leading from the boot and means to direct an air blast across the plants in the row to cause insects and undesirable matter adhering to the plants to be dislodged and conveyed into the conduit through the boot.

Other features include a receptacle detachably coupled to the conduit into which the insects and foreign matter are directed by the conduit for subsequent disposal.

Still additional features include means for introducing an insecticide into the air blast to cause the latter to cover the foliage of the plants and thus inhibit subsequent growth and development of insects on the plants.

Still further features include a beam adapted to be mounted across one end of a farm tractor, pairs of boots mounted on the beam, said boots having open sides arranged so that the open sides of each pair of boots are in opposed relation, air blast discharge nozzles mounted on the beam between the boots with their discharge ends directed toward the boots, a common receptacle for each pair of boots, conduits leading from each pair of boots to one of the receptacles and means mounted on the tractor to direct an air blast to the nozzles and across a plurality of rows of standing plants to dislodge insects and undesirable matter from the plants and direct it into the receptacles through the boots and conduits.

In the drawings:

Figure 18 is a view similar to Figure 1 of a further modification of the invention illustrating a blower as being driven by a flexible shaft from the power take-off of the tractor;

Figure 19 is a fragmentary plan view of one end of the modified form of the invention illustrated in Figure 18;

Figure 20 is a fragmentary front view of the type of device illustrated in Figure 18; and, Figure 21 is a sectional view on a slightly enlarged scale taken substantially along the line 41—41 of Figure 19.

Figure 1:
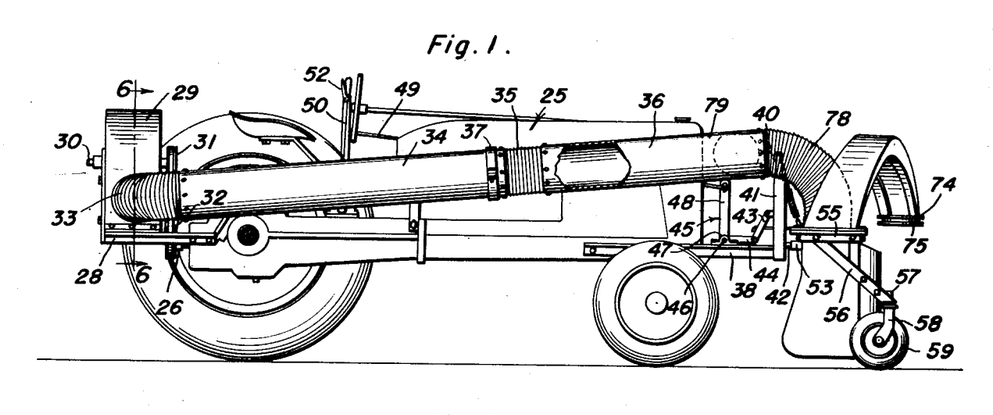
Figure 1 is a side view of a farm tractor equipped with my improved plant cleaning and insect control attachment.

Referring to the drawings in detail, a conventional farm tractor designated generally 25 in Figure 1 is equipped at its rear end with a drive pulley 26 of conventional power take-off.

Fixed to the side bars of the tractor and extending rearwardly therefrom is a pair of spaced parallel supporting bars 28 upon which a conventional blower 29 is mounted in any suitable manner. The drive shaft 30 of the fan of the blower 29 is equipped with a drive pulley 31 which has driving connection with the power take-off pulley 26 of the tractor 25 through the medium of an endless belt 32. Coupled by a flexible conduit 33 to the discharge end of the blower 29 is a conduit 34 which extends along one side of the tractor toward its forward end and coupled to the conduit 34 by a link 35 of flexible conduit is a rigid conduit 36 which extends forwardly beyond the forward end of the hood enclosing the power plant of the tractor. A suitable supporting bracket 37 is fixed to the side of the tractor 25 and encircles the forward end of the conduit section 34 in order to hold it in proper position on the tractor while the forward conduit 36 may flex with the movements of the frame to be more fully hereinafter described.

Bolted or otherwise rigidly attached to the side rails of the frame of the tractor are forwardly extending supporting bars 38 carrying at their forward ends a cross bar 39. A standard 40 extends upwardly from the cross bar 39 substantially midway between opposite ends thereof, and mounted for vertical sliding movement on the standard is a sleeve 41 carrying adjacent its lower end a forwardly extending pivot pin 42 the axis of which lies substantially in the plane of the longitudinal axis of the tractor 25. Pivoted to and extending rearwardly and downwardly from the sleeve 41 intermediate its ends is a link 43 to the lower end of which is pivoted the forward end of an arm 44 of a bell crank lever designated generally 45. This bell crank lever is mounted on a rock shaft 46 which is mounted to rock in bearings 47 carried by the guide bars 38 as will be readily understood upon reference to the drawings. The arm 28 of the bell crank lever 45 opposite the lever 44 projects upwardly and coupled to the upper end of the arm 48 is one end of a pull rod 49, the opposite end of which is connected to a hand lever 50 which is pivotally supported on a suitable bracket 51 near the position of the operator of the tractor so that the hand lever 50 will be in easy reach of the operator. The lever 50 is equipped with a conventional latch mechanism 52 which is adapted to cooperate with a conventional quadrant 53 carried by the bracket 51 so as to hold the lever in various adjusted positions about its pivot. It will thus be seen that by moving the hand lever 50 about its pivot, the sleeve 41 may be moved to various heights on the standard or column 40.

Mounted for rocking movement on the forwardly extending shaft 42 is a sleeve 53 to which is fixed frame 54 comprising a pair of laterally extending spaced parallel supporting bars 54'. These bars are co-extensive with one another and project laterally beyond opposite sides of the tractor 25, and opposite ends of the bars 54' are joined by end bars 55 to each of which is connected a depending frame 56. Mounted for rotation in each frame 56 about a vertical axis is the shank 57 of a yoke 58 in which a caster wheel 59 is mounted to rotate. Fixed to the upper end of the standard or column 40 is a pair of oppositely extending guy wires 60 which are provided intermediate their ends with retractile springs 61 and turnbuckles 62. The ends of the guy wires 60 opposite those which are connected to the standard or column 40 are coupled through the medium of suitable loops or eyes 63 to the rearmost bar 54' of the frame 54 intermediate the ends thereof and the shaft 42. It will thus be seen that the frame formed by the bars 54 and 55 may rock about the axis of the shaft 42 under the influence of the wheels 59, and yet return to its initial position under the influence of the springs 61.

Supported at opposite ends of the frame 54 formed by bars 54' and 55 are depending boots designated generally 64. Similar boots designated generally 65 are supported intermediate the ends of the bars 54 in spaced parallel relation on opposite sides of the pivot shaft 42. Each boot comprises a vertically extending wall 66 provided along one vertical edge with an upwardly extending flange 67 which terminates at its free edge in a flange 68 which lies parallel with the wall 66 but projects from the flange 67 in a direction opposite the wall 66. The edge of the wall 66 remote from the flange 67 is provided with a parallel flange 69 which terminates intermediate the upper and lower ends of the wall 66 and projects from the wall 66 in the direction of the flange 67. A rearwardly extending guard member 70 extends from the rear edge of the wall 66 in the frame thereof, and cooperates with the wall 66 in directing the flow of air upwardly as will be more fully hereinafter described.

Figures 2, 6:
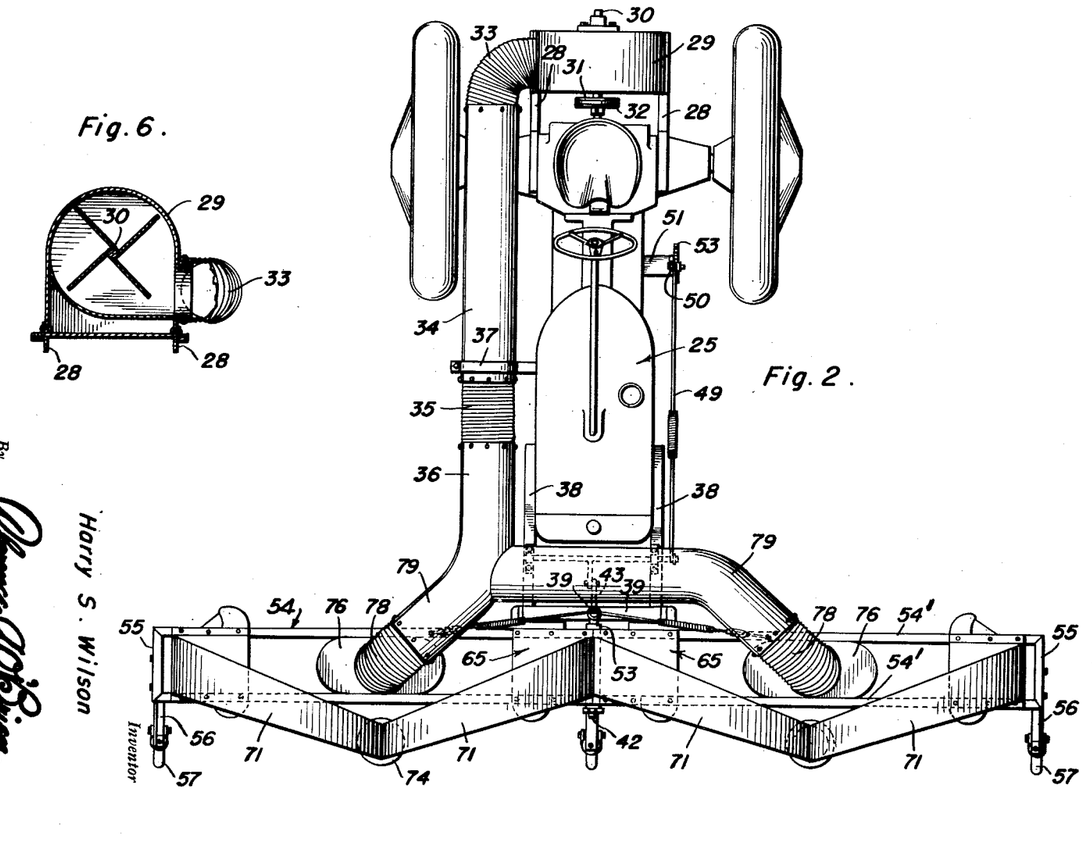
Figure 2 is a top plan view of the tractor and control attachment illustrated in Figure 1.
Figure 6 is a fragmentary sectional view taken substantially along the line 6—6 of Figure 1.
Figure 3:
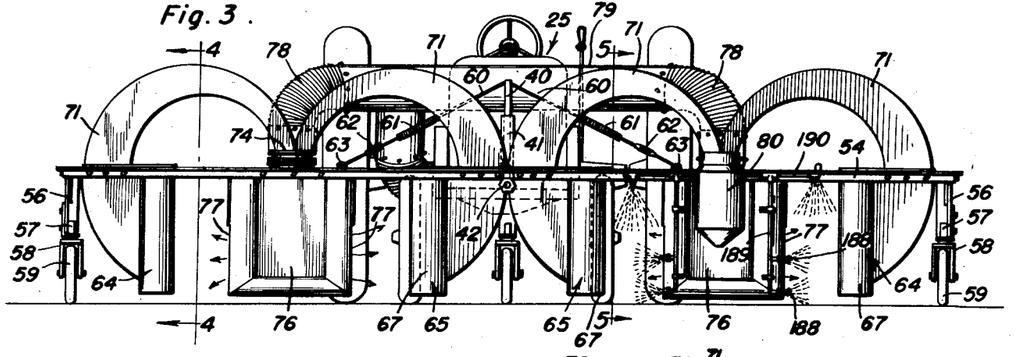
Figure 3 is a front view of the device illustrated in Figures 1 and 2.
Figure 4:
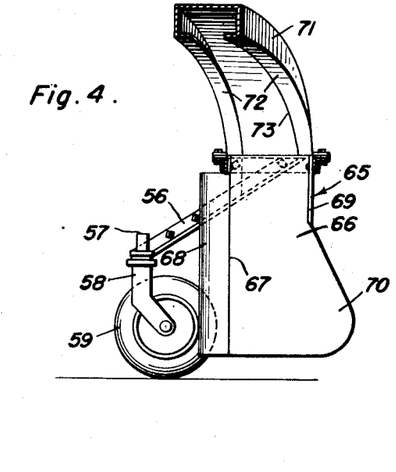
Figure 4 is a fragmentary enlarged sectional view taken substantially along the line 4—4 of Figure 3.

Coupled in any suitable manner to the upper edge of each boot 65 is an arched conduit 71 which comprises a substantially transversely channel-shaped body having the channel inverted and the flanges of which are formed with inwardly extending flanges 72 to form on the bottom periphery of the arched conduit an air escape opening 73 in the form of a longitudinal bottom slot in the conduit coextensive therewith and narrower than the same. As illustrated in Figure 2 the arched conduits 71 extend upwardly and forwardly and terminate at their ends opposite the boots 65 in a common discharge and coupling ring 74. Each such ring 74 is provided with an annular groove 75, the purpose of which will be more fully hereinafter explained.

As illustrated the open sides of the boots 64 are arranged in opposed relation, and mounted on the frame 54 formed between each pair of boots are air discharge nozzles 76, each of which is provided with a vertically extending air discharge slot 77 which opens toward an adjacent boot, so that air entering the discharge nozzles 76 will be directed across the space between the nozzles 76 and the boots 64 to blow insects and foreign matter from plants which may be standing between the nozzles and the boots. Opening into the upper end of each nozzle 76 is a flexible conduit 78 which is coupled through the medium of the branch pipe 79 to the forward end of the conduit 36 previously described. It will thus be seen that the air blast created by the blower 29 will be directed through the nozzles 76 and into the boots 65.

Figure 13:
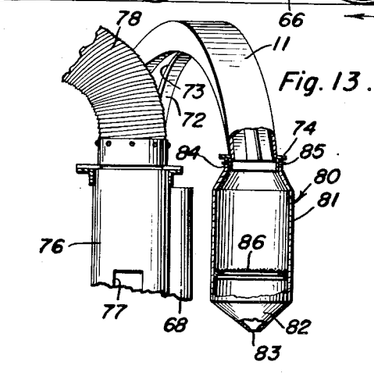
Figure 13 is a fragmentary sectional view similar to Figure 11 illustrating in section another type of receptacle.

Detachably supported on the end of each discharge and coupling ring 74 is a receptacle designated generally 80 which in one form comprises a small cylindrical body 81 (Fig. 13) provided with a conical bottom 82 formed with an axial discharge opening 83. The end of the cylindrical body 81 opposite the bottom 82 is provided with a reduced neck 84 having radially spaced set screws 85 for engagement in the annular groove 75 is a coupling ring 74. A suitable foraminous wall 86 extends transversely within the cylindrical body 81 so that insects and foreign matter carried through the arched conduits 71 by the air blast will be intercepted by the foraminous wall and retained within the receptacle 80 while the air blowing thereinto is discharged into the opening 83.

Figure 11:
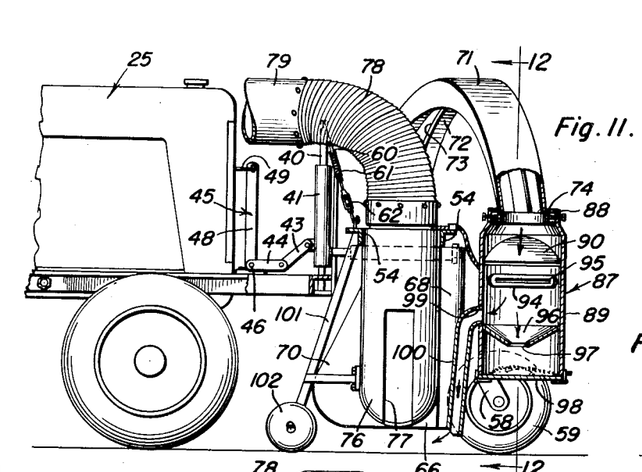
Figure 11 is a fragmentary view on a slightly enlarged scale of the type of attachment illustrated in Figure 1, showing the preferred form of receptacle for the insects and undesirable matter.
Figure 12:
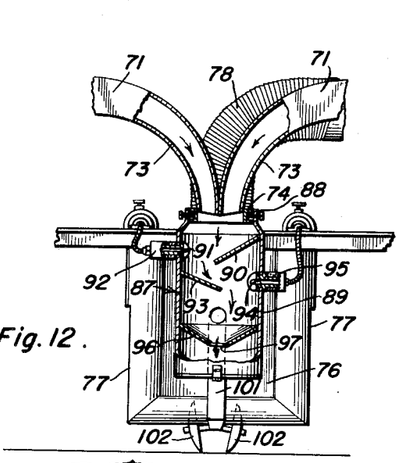
Figure 12 is a fragmentary sectional view taken substantially along the line 12—12 of Figure 11.

In certain instances it is desirable completely to destroy the insects and foreign matter in which event a receptacle designated generally 87 is employed. This receptacle like the receptacle 80 is equipped with a reduced neck 88 carrying coupling means for connection to the coupling and discharge ring 74 and comprises a cylindrical body 89 provided adjacent its upper end and inwardly extending downwardly inclined baffle plate 90 which extends partly across the receptacle as will be readily understood upon reference to Figures 11 and 12. Formed in the side of the receptacle 89 directly opposite the baffle plate 90 is a burner opening 91 in which a suitable gaseous fuel burner 92 is supported in such a position as to direct the flames issuing therefrom toward the baffle plate 90. A similar baffle plate 93 extends inwardly and downwardly across the receptacle from the side having the opening 91 therein, and this wall 93 is disposed slightly below the burner 92 and the lower edge of the baffle plate 90. Formed in the wall of the tubular body 89 opposite the baffle plate 93 is a burner opening 94 in which is supported a suitable gaseous fuel burner 95. The burner 95 is supported in such a position that flame issuing therefrom will be directed toward the baffle plate 93, and extending transversely across the body 89 near its lower end is an inverted conical wall or baffle 96 having an axial discharge opening 97 at its apex. A hinged door 98 closes the lower end of the tubular body 89, and formed in the side of the tubular body slightly above the conical baffle 96 is an air discharge opening 99 to which a downwardly extending air discharge conduit 100 is connected. With this type of receptacle designated generally 87 I prefer to employ a rearwardly extending frame 101 which is detachably coupled to the rear side of each discharge nozzle 76 and carries at its lower end a pair of convergent dished wheels 102. When the receptacle 87 is employed the door 98 is periodically opened to discharge the burned contents of the receptacle onto the ground, and the dished wheels 102 serve to bury the ashes into the ground as the treatment of the plants progresses.

Figure 14:
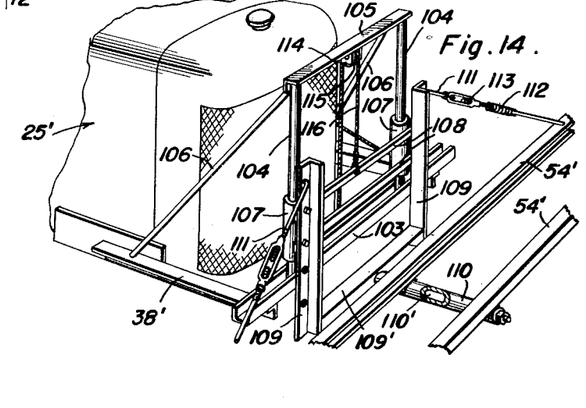
Figure 14 is a fragmentary perspective view of the forward end of a farm tractor illustrating a modified form of mounting for the attachment.

In Figure 14 I have shown an alternative mounting for the plant cleaning and insect control attachment and in this structure the tractor is designated generally 25' and has attached to the side members of its frame forwardly projecting angle bars 38' which correspond in many respects to the bar 38 previously described. Extending transversely across the forward ends of the bars 38' is an inverted channel bar 103 supporting adjacent opposite ends vertically extending columns or standards 104, the upper ends of which support a transversely extending angle bar 105 which also serves to hold the standards 104 in spaced parallel relation. Suitable brace rods 106 extend rearwardly and downwardly from the upper ends of the standards 104 and are coupled at their lower rear ends to the angle bars 38' in order rigidly to hold the standards 104 in upright position.

Mounted for vertical sliding movement on each standard 104 is a sleeve 107, and extending transversely of the machine and coupled at opposite ends to the sleeves 107 are spaced parallel horizontally extending tie bars 108 to opposite ends of which are fixed vertically extending angle bars 109. The lower ends of the angle bars 109 have rigidly fixed thereto a transversely extending bar 109' and projecting forwardly from the bar 109' intermediate its ends is a shaft 110' which is rockably received in a tube 110 which is welded or otherwise fixed to the spaced parallel bars 54' forming a supporting frame for the boots, nozzles, and conduits previously described. Fixed adjacent the upper ends of the vertically extending angle bars 109 are guy rods 111 each of which extends outwardly and downwardly, and is attached at its end remote from that connected to its respective angle bar 109 to a bar 54'. Like the guy rods previously described each guy rod 111 is equipped with a retractile coil spring 112 and a turnbuckle 113. Secured to the transversely extending bar 105 substantially midway between opposite ends is a bracket 114 in which a sheave 115 is rotatably supported. A cable 116 is fixed at one end to the uppermost bar 108, and entrained over the sheave 115, and suitable guide pulleys (not shown) with its end opposite that coupled to the bar 108 connected to a control mechanism, such as the lever 58, by which pull may be exerted thereon to raise the plant cleaning and insect control equipment previously described.

Figure 7:
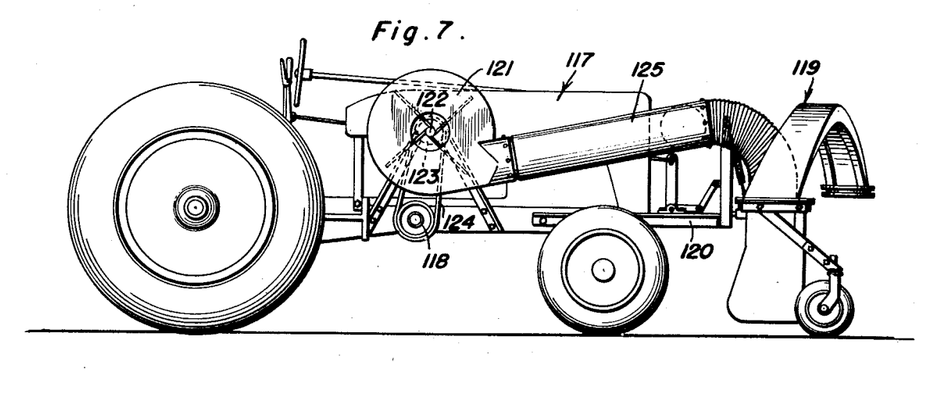
Figure 7 is a side view of a farm tractor showing a modified form of attachment in place thereon.

In the modification illustrated in Figure 7 a tractor designated generally 117 is equipped with a power take-off pulley 118 intermediate its ends. The plant cleaning equipment designated generally 119 which corresponds in all respects to that previously described is mounted on spaced parallel bars 120 at the forward end of the tractor 117, but in place of the blower 29 previously described, which is mounted at the rear end of the tractor 25, I mount on the side of the tractor 117 a blower 121, the drive shaft 122 of which carries a drive pulley 123 over which an endless belt 124 is entrained. This belt has driving connection with the drive pulley 118 of the power take-off pulley of the tractor 117, and the discharge end of the blower is coupled through the medium of a suitable conduit 125 to the conduit leading to the discharge nozzles of the plant cleaning and insect control equipment 119. It will thus be seen that the length of conduit necessary to operate the plant cleaning and insect control equipment may be materially shortened by mounting the blower 121 on the side of the tractor 117.

Figure 8:
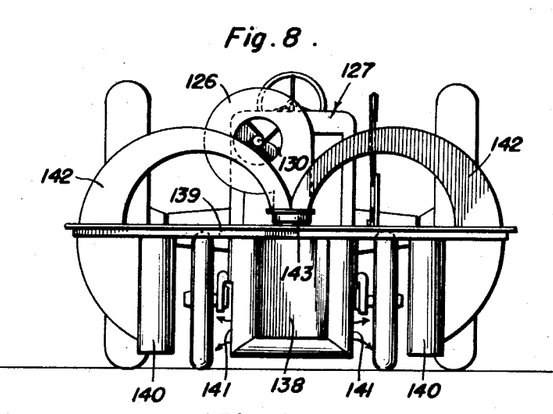
Figure 8 is a front view of another modification.
Figure 9:
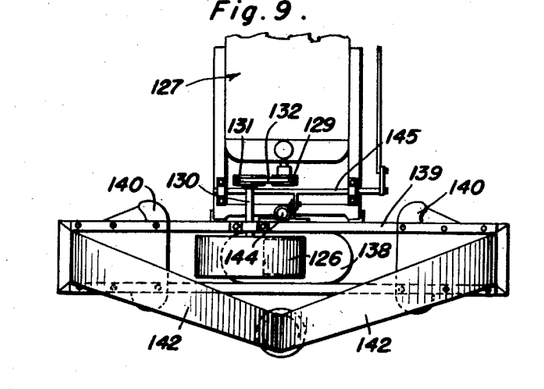
Figure 9 is a fragmentary top plan view of the device illustrated in Figure 8.
Figure 10:
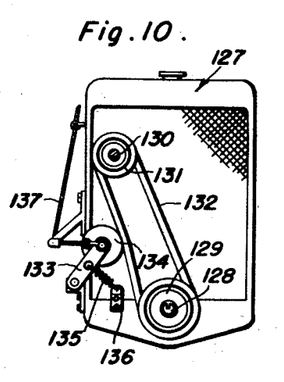
Figure 10 is a fragmentary sectional view illustrating the drive mechanism of the modified form of the invention illustrated in Figures 8 and 9.
Figure 17:
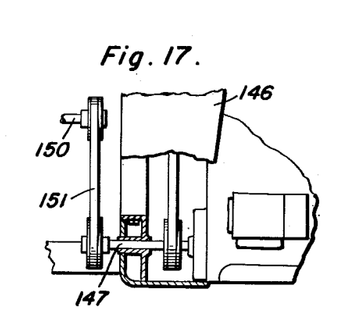
Figure 17 is a fragmentary sectional view showing the drive means for the device illustrated in Figures 15 and 16.
Figures 18, 19, 20, 21:
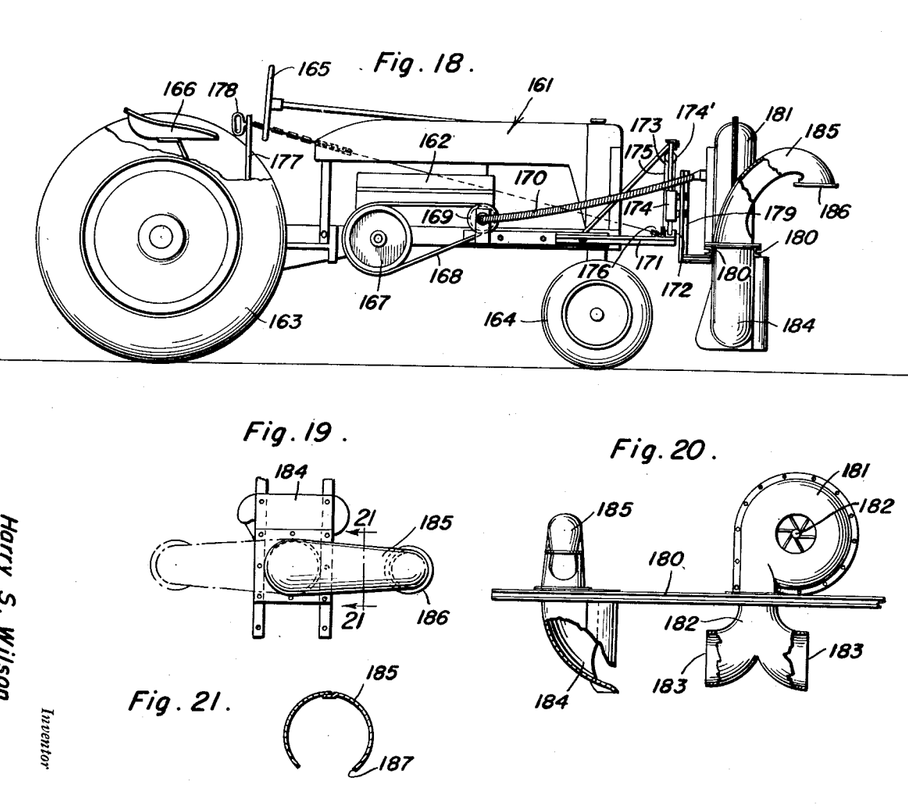

In the modification illustrated in Figures 8, 9 and 17, a blower 126 is mounted at the forward end of a tractor designated generally 127, the crank shaft 128 of the motor of which is extended forwardly and carries a drive pulley 129. The blower shaft 130 carries a drive pulley 131, and entrained over the drive pulleys 129 and 131 is an endless belt 132. Pivotally supported on the side of the tractor for movement toward or away from the belt 132 is a lever arm 133 carrying an idler pulley 134 which is rotatably supported in the plane of the pulleys 129 and 130 for movement toward or away from belt 132. A retractile coil spring 135 is connected at one end to the lever 133 and at its opposite end to a suitable bracket 136 fixed to the tractor in such a position that the spring 135 will exert pull on the arm 133 to move the idler pulley 134 to tighten the belt 132. A suitable control cable 137 is connected at one end to the lever 133, and its opposite end leads rearwardly to a point within easy reach of the operator of the tractor so that the driving of the fan of the blower 126 may be easily controlled. The discharge end of the fan enters a nozzle 138 which corresponds in all respects to the nozzles 76 previously described. As illustrated in Figure 8 the nozzle 138 is supported on a frame 139 mounted at the forward end of the tractor 127 upon which are supported the boots 140 arranged with their open sides facing the discharge openings 141 on its respective side of the discharge nozzle 138. Each boot 140 is coupled through the medium of an arched conduit 142 corresponding in all respects to the conduits 71 previously referred to and the ends of the conduits 142, opposite those which are connected to the boots, lead to a coupling ring 143 to which either a receptacle 80 or a receptacle 87 may be detachably connected. As illustrated the frame 139 is mounted on a standard or column 144 to move vertically by manipulation of a rock shaft 145 and linkage mechanism corresponding in all respects to the rock shaft 46 and the associated linkage mechanism. The structure just described is primarily for use in the treatment of two rows of standing plants.

Figure 15:
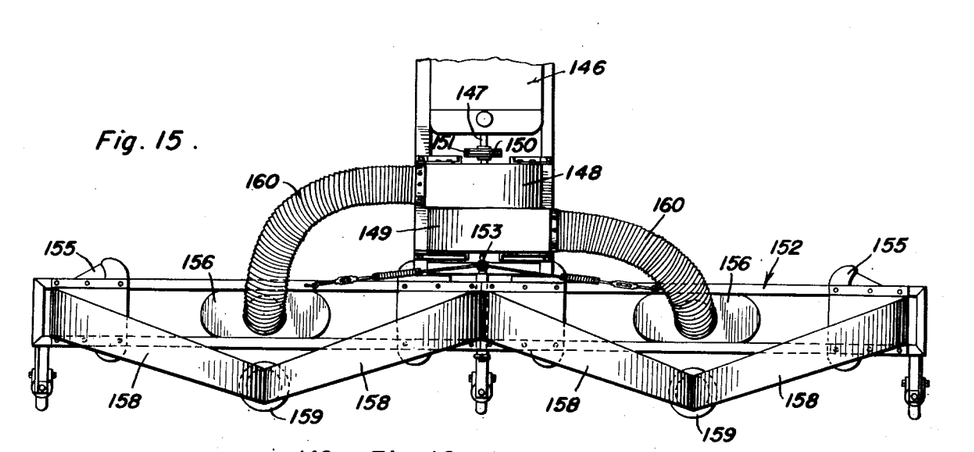
Figure 15 is a fragmentary top plan view of a further modification illustrating the use of two separate blowers driven from the front end of the tractor.
Figure 16:
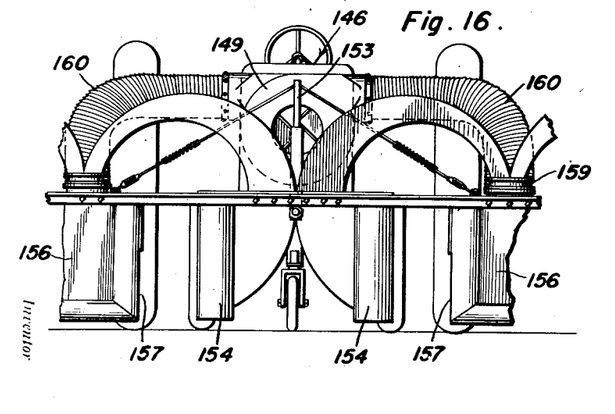
Figure 16 is a fragmentary front view in elevation of the structure illustrated in Figure 15.

In some instances where it is desired to treat a multiplicity of rows, and where the power take-off for the tractor is at the forward end thereof I find it advantageous to mount on a tractor designated generally 146 (Fig. 15), having at its forward end a power take-off shaft 147, a pair of blowers 148 and 149 with the fans thereof mounted on a common drive shaft 150 which is driven from the power take-off shaft 147 through the medium of a conventional drive belt 151. A frame designated generally 152 which corresponds in all respects to the frame 54 is mounted for vertical sliding movement at the forward end of the tractor 146 on a vertically extending column 153. Like the frame 54 the frame 152 carries midway between opposite ends oppositely facing boots 154, and adjacent opposite ends are similar boots 155 which face inwardly toward the open ends of the boots 154. Mounted in the frame 152 between oppositely disposed pairs of boots 154 and 155 are discharge nozzles 156, having in opposite walls discharge openings 157 which are directed toward the boots 154 and 155. Like the equipment previously described the boots have coupled thereto at one end arched conduits 115, the opposite ends of which are coupled to coupling rings 159 to which one or the other of the receptacles previously described may be detachably connected. A flexible conduit 160 leads from the discharge end of each fan 148 and 149 to a discharge nozzle 156 so that when the fans 148 and 149 are set into operation an air blast will be discharged through the openings 157 in the nozzles 156 and directed toward the boots 154 and 155.

In the smaller type unit best illustrated in Figures 18 through 21, a farm tractor designated generally 161 is equipped with a power plant 162, traction wheels 163 and steering wheels 164, the movements of which are governed by a steering wheel 165 mounted on the tractor near the operator's seat 166. The power plant 162 of the tractor 161 is equipped with a power take-off wheel 167 which has driving connection through the medium of an endless belt 168 to a drive pulley 169 to which a flexible shaft of conventional construction 170 is coupled.

Mounted at the forward end of the tractor are forwardly extending bars 171 supporting adjacent their forward ends a suitable transversely extending channel bar 172 supporting spaced parallel standards 173 upon which are mounted for vertical sliding movement sleeves 174. The upper ends of these standards are joined by a cross bar 174, and mounted on this bar midway between the standards is a sheave 175. A flexible cable 175' is entrained over this sheave and leads downwardly over a suitable guide pulley 176 and then rearwardly through a suitable bracket 177 to a hand grip 178 which is located within easy reach of the operator of the vehicle when seated on the seat 166. Attached to the sleeves 174 is a frame 179 carrying a pair of spaced transversely bars 180 upon which is mounted midway between opposite ends a blower 181. To the drive shaft of the blower is coupled one end of the flexible shaft 170 so that when the power take-off pulley 167 is driven, the fan of the blower 181 also will be driven. The discharge end of the blower is directed downwardly between the bars 180 and is coupled to an inverted Y-shaped nozzle 182 having vertically extending oppositely disposed discharge slots 183 through which the air blast created by the blower 181 is directed. Disposed on the bars 180 in spaced relation to the discharge slots 183 in the discharge nozzle 182 are boots 184, having open sides which are directed toward the slots 183 so that air issuing from the slots 183 will be directed into the boots 184. Each boot is provided with an arched discharge conduit 185 which leads upwardly and forwardly and terminates at its forward end in a suitable coupling flange 186 to which one of the receptacles 80 or 81 may be coupled. The arched conduit 185 leading from each boot 184 is provided on its inner periphery with an air discharge slot 187 so that the pressure of air entering the conduit from the boot will be gradually diminished as the coupling ring 186 is approached.

Figure 5:
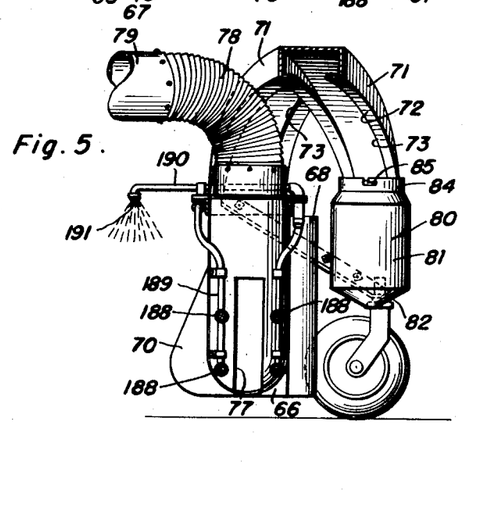
Figure 5 is a fragmentary enlarged sectional view taken substantially along the line 5—5 of Figure 3.

In certain instances it is desirable to equip each air discharge nozzle with discharge nozzles 188 through which insecticide may be introduced into the air blast issuing through the discharge openings, thereof. In one example, these discharge nozzles 188, as illustrated in Figure 5, are coupled through the medium of a suitable manifold 189 to a spray pipe 190 leading from any suitable source of liquid insecticide. A suitable spray nozzle 191, and the nozzles 188 are so arranged on the air blast nozzles that the insecticide issuing therefrom will be discharged into the air blast issuing from the respective air discharge nozzle with which the nozzles 188 and 189 may be associated.

In use it will be understood that the tractor is driven through a field so that the rows of standing crops will pass between the air blast nozzles and their respective boots. With the blower on the respective tractor in operation an air blast will be directed through the discharge slots in the air blast nozzles so as to cause the plants, standing in the rows being treated, to be blown into the respective boots and by reason of the scraping action of the boots against the plants and the leaves thereof any insects, spoiled or damaged fruit, or foreign matter will be dislodged from the plants and blown through the arched conduits into the receptacles coupled to the coupling ring where they may be gathered, or destroyed according to the type of receptacle employed. In the meantime the pressure of the air entering the boots is gradually dissipated by reason of the slots which extend longitudinally of the inner peripheries of the arched conduits, so that by the time the undesirable material has reached a position where it will fall by gravity into a receptacle, the force of the air blast will have been dissipated so that little or no pressure will be created within the receptacle into which the insects and foreign matter have been discharged.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. In a mobile suction machine for removing insects from plants, a portable frame, a vertically adjustable support mounted on the frame, a pair of vertical boots carried by the support, said boots having open sides arranged so that the open sides are in opposed relation, air discharge nozzles carried by the support and facing the open sides of the boots, a common receptacle for said boots, upwardly arched conduits leading from the sides of said boots opposite said open sides to the receptacle, each of said conduits having a longitudinal bottom slot in its underside coextensive therewith whereby the pressure of the air entering the boots and forcing insects from the plants therein will be gradually diminished as it approaches the receptacle, said conduits having juxtaposed discharge ends, and a ring coupling said ends together and to said receptacle and detachably suspending the receptacle.

2. In a mobile suction machine for removing insects from plants, a wheeled frame having a front end, an elongated cross frame on the front end of the wheeled frame, a pair of vertical boots depending from said cross frame and spaced apart on said cross frame transversely of the wheeled frame with confronting open sides, air discharge nozzles depending from said cross frame intermediate said boots with open sides facing the open sides of the vertical boots, upwardly arched discharge conduits leading from the sides of the boots opposite said open sides of the boots and converging forwardly of said cross frame with juxtaposed downturned discharge ends spaced forwardly of said cross frame, and a receptacle for collecting the discharge from said conduits suspended from the discharge ends of the conduits in front of said cross frame.

3. The combination of claim 2, said conduits comprising channel members inverted and providing bottom air escape slots therein coextensive in length with that of said conduits.

HARRY S. WILSON.

References Cited in the file of this patent

UNITED STATES PATENTS

| Number | Name | Date |
|---|---|---|
| 986,193 | Meek | Mar. 7, 1911 |
| 1,035,012 | Hoselton | Aug. 6, 1912 |
| 1,189,720 | Morrow | July 4, 1916 |
| 1,503,159 | Haywood | June 29, 1924 |
| 1,526,642 | Nissley | Feb. 17, 1925 |
| 1,560,529 | Betts | Nov. 10, 1925 |
| 1,849,425 | Guerra | Mar. 15, 1932 |
| 2,111,030 | Mote | Mar. 15, 1938 |
| 2,179,766 | Webb | Nov. 14, 1939 |
| 2,188,094 | Grabe | Jan. 23, 1940 |
| 2,210,346 | Stayton | Aug. 6, 1940 |
| 2,305,913 | Troyer | Dec. 22, 1942 |
| 2,346,270 | Nisbet | Apr. 11, 1944 |
| 2,412,181 | Smith | Dec. 3, 1946 |
| 2,425,419 | Carnes | Aug. 12, 1947 |